(12) United States Patent
Narayanaswamy et al.

(10) Patent No.: US 7,949,619 B2
(45) Date of Patent: May 24, 2011

(54) BUSINESS PROCESS ANALYZER THAT SERIALIZES OBTAINED BUSINESS PROCESS DATA AND IDENTIFIES PATTERNS IN SERIALIZED BUSINESS PROCESSS DATA

(75) Inventors: Sreedhara Srinivasulu Narayanaswamy, Plano, TX (US); Sudhakar Anivella, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 676 days.

(21) Appl. No.: 12/023,723

(22) Filed: Jan. 31, 2008

(65) Prior Publication Data

US 2009/0198639 A1   Aug. 6, 2009

(51) Int. Cl.
*G06F 15/18* (2006.01)
(52) U.S. Cl. .......................................................... 706/12
(58) Field of Classification Search .................... 706/12, 706/45–48, 62; 705/1.1, 7, 300, 301
See application file for complete search history.

(56) References Cited

U.S. PATENT DOCUMENTS

| 5,734,837 A | 3/1998 | Flores et al. |
| 6,073,109 A | 6/2000 | Flores et al. |
| 2004/0187140 A1 | 9/2004 | Aigner et al. |
| 2005/0154700 A1 | 7/2005 | Lele |
| 2005/0289138 A1 | 12/2005 | Cheng et al. |
| 2007/0226022 A1* | 9/2007 | Das et al. .......................... 705/7 |

OTHER PUBLICATIONS

Scacchi, Experience with software process simulation and modeling, 1998, USC Atrium Laboratory, pp. 1-10.*
Scacchi et al., Process Life-Cycle Engineering: A Knowledge-Based Approach and Environment, 1997, John Wiley & Sons, Ltd, pp. 1-25.*
Scacchi et al., Process-Driven Intranets: Life-Cycle Support for Process Reengineering, 1997, IEEE INternet Computing, pp. 1-8.*
Curbera et al., The Next Step in Web Services, 2003, Communications of ACM vol. 46 issue 10, pp. 1-6.*
Hill et al., Magic Quadrant for Business Process Management Suites, 2007, Gartner Research ID No. G00152906, pp. 1-31.*
Koliadis, et al., Combining i* and BRMN for Business Process Model Lifecycle Management, 2006, BPM 2006 Workshops, LNCS 4103, pp. 1-12.*

* cited by examiner

*Primary Examiner* — David R Vincent
(74) *Attorney, Agent, or Firm* — Scully, Scott, Murphy & Presser, P.C.

(57) ABSTRACT

A system and method for analyzing enterprise applications driven by business processes is provided. The method for analyzing business processes comprises the steps of obtaining process data, serializing the process data, identifying patterns in the serialized process data, creating analyzed process data based on the identified patterns, and publishing the analyzed process data. In addition, the patterns can be identified using one or more of user-defined algorithms, rules, and reference process models, and the user-defined algorithms can be plug-ins. Also, information regarding the analyzed process data can be displayed.

8 Claims, 8 Drawing Sheets

Fig. 6

BSO Business Optimization Engine

[Extract] [Analyze] [Export BPML]  Status [Optimizing done] [Clear]

Issue: 123, Title: Mail not working
Priority: P1, Date Created: 01/02/2006T11:00:00

| Status | Description | Note By | TimeStamp |
|---|---|---|---|
| CREATED | Mail not working | Smith | 01/02/2006 T 11:00:00 |
| ASSIGNED | Mail not working | Bob | 01/02/2006 T 12:00:00 |
| WORKINPROGRESS | Please detail about it. Are you getting any specific error? | Bob | 01/02/2006 T 12:30:00 |
| WORKINPROGRESS | It is displaying an error unable to POP mail from server. | Smith | 01/02/2006 T 12:45:00 |
| WORKINPROGRESS | What is the version of Mail? | Bob | 01/02/2006 T 12:58:00 |
| WORKINPROGRESS | Mail 2000 | Smith | 01/02/2006 T 13:08:00 |

Issue: 124
Priority: P2       Title: Account Locked     Date Created: 01/02/2006T11:16:00

| Status | Description | Note By | TimeStamp | Hrs/Events | Std Hrs./Events | Deviation (Hrs) | Updated (Hrs:) |
|---|---|---|---|---|---|---|---|
| CREATED | Account is locked. | Brad | 01/02/2006 T 11:16:00 | 0.0 | 0.0 | 0.0 | 0.0 |
| ASSIGNED | Account is unlocked and reset. | | 01/02/2006 T 12:01:00 | 0.75 | 0.5 | -0.25 | 0.75 |
| WORKINPROGRESS | Account is unlocked. I am able... | Joe | 01/02/2006 T 12:12:00 | 0.18 | 0.5 | 0.32 | 0.18 |
| CLOSED | | Brad | 01/02/2006 T 12:33:00 | 0.35 | 5.0 | 4.65 | 0.35 |
| | | | | 1.27 | 6.0 | 4.73 | |

User Input

Issue: 125     Title: Unable to access Internet

| Issue | Priority | Status | Date Created | Total Time Taken (Hrs.) | Original Time (Hrs.) | Total Deviation (Hrs.) |
|---|---|---|---|---|---|---|
| 123 | P1 | CREATED | 01/02/2006 T 11:00:00 | 2.45 | 3.0 | 0.54 |
| 124 | P2 | ASSIGNED | 01/02/2006 T 11:16:00 | 1.27 | 6.0 | 4.73 |
| 125 | P2 | WORKINPROGRESS | 01/02/2006 T 11:36:00 | 2.63 | 6.0 | 3.37 |
| 126 | P3 | | 01/02/2006 T 12:59:00 | 75.14 | 6.0 | -69.14 |
| 127 | P3 | CLOSED | 01/02/2006 T 14:34:00 | 212.22 | 6.0 | -206.22 |

Original value computed by BPO

Fig. 7

BSO Business Optimization Engine

[Extract] [Analyze] [Export BPML]   Status [Optimizing done] [Clear]

Issue: 123, Title: Mail not working
Priority: P1, Date Created: 01/02/2006T11:00:00

| Status | Description | Note By | TimeStamp |
|---|---|---|---|
| CREATED | Mail not working | Smith | 01/02/2006 T 11:00:00 |
| ASSIGNED | Mail not working | Bob | 01/02/2006 T 12:00:00 |
| WORKINPROGRESS | Please detail about it. Are you getting any specific error? | Bob | 01/02/2006 T 12:30:00 |
| WORKINPROGRESS | It is displaying an error unable to POP mail from server. | Smith | 01/02/2006 T 12:45:00 |
| WORKINPROGRESS | What is the version of Mail? | Bob | 01/02/2006 T 12:58:00 |
| WORKINPROGRESS | Mail 2000 | Smith | 01/02/2006 T 13:08:00 |

Issue: 124
Priority: P2

Title: Account Locked
Date Created: 01/02/2006T11:16:00

| Status | Description | Note By | TimeStamp | Hrs/Events | Std Hrs./Events | Deviation (Hrs) | Updated (Hrs:) |
|---|---|---|---|---|---|---|---|
| CREATED | Account is locked. | Brad | 01/02/2006 T 11:16:00 | 0.0 | 0.0 | 0.0 | 0.0 |
| ASSIGNED | Account is unlocked and reset. | | 01/02/2006 T 12:01:00 | 0.75 | 0.5 | -0.25 | 0.25 |
| WORKINPROGRESS | Account is unlocked. I am able... | Joe | 01/02/2006 T 12:12:00 | 0.18 | 0.5 | 0.32 | 0.18 |
| CLOSED | | Brad | 01/02/2006 T 12:33:00 | 0.35 | 5.0 | 4.65 | 0.35 |
| | | | | 1.27 | 6.0 | 4.73 | |

← New User Input

Issue: 125

Title: Unable to access Internet

| Issue | Priority | Date Created | Total Time Taken (Hrs.) | Original Time (Hrs.) | Total Deviation (Hrs.) |
|---|---|---|---|---|---|
| 123 | P1 | 01/02/2006 T 11:00:00 | 2.45 | 3.0 | 0.54 |
| 124 | P2 | 01/02/2006 T 11:16:00 | 0.78 | 6.0 | 5.22 |
| 125 | P2 | 01/02/2006 T 11:36:00 | 2.63 | 6.0 | 3.37 |
| 126 | P3 | 01/02/2006 T 12:59:00 | 75.14 | 6.0 | -69.14 |
| 127 | P3 | 01/02/2006 T 14:34:00 | 212.22 | 6.0 | -206.22 |

← New process behavior automatically computed by BPO

US 7,949,619 B2

BUSINESS PROCESS ANALYZER THAT SERIALIZES OBTAINED BUSINESS PROCESS DATA AND IDENTIFIES PATTERNS IN SERIALIZED BUSINESS PROCESSS DATA

CROSS-REFERENCE TO RELATED APPLICATIONS

This application is related to the following commonly-owned, co-pending United States Patent Applications filed on even date herewith, the entire contents and disclosure of each of which is expressly incorporated by reference herein as if fully set forth herein. U.S. patent application Ser. No. 12/023,618, for "BUSINESS OPTIMIZATION ENGINE"; U.S. patent application Ser. No. 12/023,741, for "BUSINESS PROCESS EXTRACTOR"; U.S. patent application Ser. No. 12/023,676, for "BUSINESS PROCESS OPTIMIZER".

FIELD OF THE INVENTION

The present invention relates generally to process optimization technology, and more specifically to a system and method for optimizing enterprise applications driven by business processes.

BACKGROUND OF THE INVENTION

In today's world, continuous optimization of operational methods and procedures is a major focus of all major businesses. However, performing enterprise operations often requires implementing multiple, discrete computer applications. As a result, capturing and understanding operations or business processes that are part of an enterprise's business information technology (IT) solution is critical for any organization's optimization initiative. Among the many challenges faced when trying to understand operations are heterogeneous applications throughout the organization with no uniform way to capture and/or extract information from these applications, business processes that age before the advent of business process management (BPM) tools that are currently used for designing them, a gap between designed processes and executable process, and a need for human investigation to identify problems and suggest improvements for business processes.

U.S. Pat. Nos. 5,734,837 and 6,073,109 disclose a typical workflow engine, that is, a programming tool for workflow. A process can be created based on the workflow. However, neither analysis nor optimization of the process is performed.

U.S. Patent Application Publication No. 2005/0289138 discloses a near real-time system and method that analyzes large amounts of data. While the system uses XML format, it analyzes only data, not processes, and merely reports results. No optimization is performed. Similarly, U.S. Patent Application Publication No. 2005/0154700 discloses an extraction, analysis and processing system for specialized data from service industries. This approach is somewhat like typical data mining systems but focuses on a specific type of data, that of services industries.

U.S. Patent Application Publication No. 2004/0187140 discloses an application framework that may contain business processes. However, no analysis or optimization of the processes is performed.

Among the problems of the aforementioned systems are the lack of a standard way to capture and/or extract information from heterogeneous business applications, and the lack of automated means to identify and interpret business process problems, and to suggest improvements to maximize process results.

BRIEF SUMMARY OF THE INVENTION

The present invention advantageously provides a system and method for optimizing enterprise applications driven by business processes. The system includes a data repository, an extractor to perform real time extraction of process life cycle information from business solutions integrating heterogeneous independent business applications, the extractor storing the extracted information in the data repository, an analyzer to identify usage patterns in the extracted information, and an optimizer to optimize the extracted information and to create exportable output usable by external tools. The analyzer can employ user-defined algorithms and/or rules to identify the usage patterns. The optimizer can use process simulation mechanisms, what-if analysis, data stored in the data repository, data stored in a rule repository, and user input data, in any combination, to optimize the extracted information.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 is a screen display of an exemplary embodiment;

FIG. 7 is another screen display of an exemplary embodiment; and

DETAILED DESCRIPTION OF THE INVENTION

An inventive solution is presented to the need for a system and method to capture, evaluate, interpret, and optimize business processes that are part of business IT solutions. The disclosed business optimization engine (BOE) solves this problem with a system and method that provides a framework for extracting, analyzing, and optimizing business processes that bind heterogeneous enterprise applications together to deliver business functionality.

BOE provides a framework for operational business intelligence applications that would enable business analysts to understand how current business processes, as implemented in heterogeneous applications, actually perform their tasks, by clearly showing each step or task as well as the interaction among tasks in detail. BOE goes beyond a workflow examination to explore process flows. With its thorough extraction and analysis method, BOE generates a complete and accurate extracted business process from which an improved process can be designed. BOE enables users to discover problems with the current business processes, such as weak spots, bottlenecks, manual steps, and redundancies. Further, BOE offers recommendations for solving these problems by using predefined knowledge and reference models modeling end-to-end business or life cycle processes, as well as individual rules describing various steps of a business process. In addition to providing problem solving recommendations, the knowledge and reference models create a baseline for future analysis using adaptive learning techniques.

BOE does not require that a specific BPM tool be used in any of the applications. Instead, BOE can monitor messages generated by a variety of applications or middleware, so that integration among multiple applications can be achieved. Each component of BOE can function as a well defined set of web services to achieve seamless integration.

Figure 1:
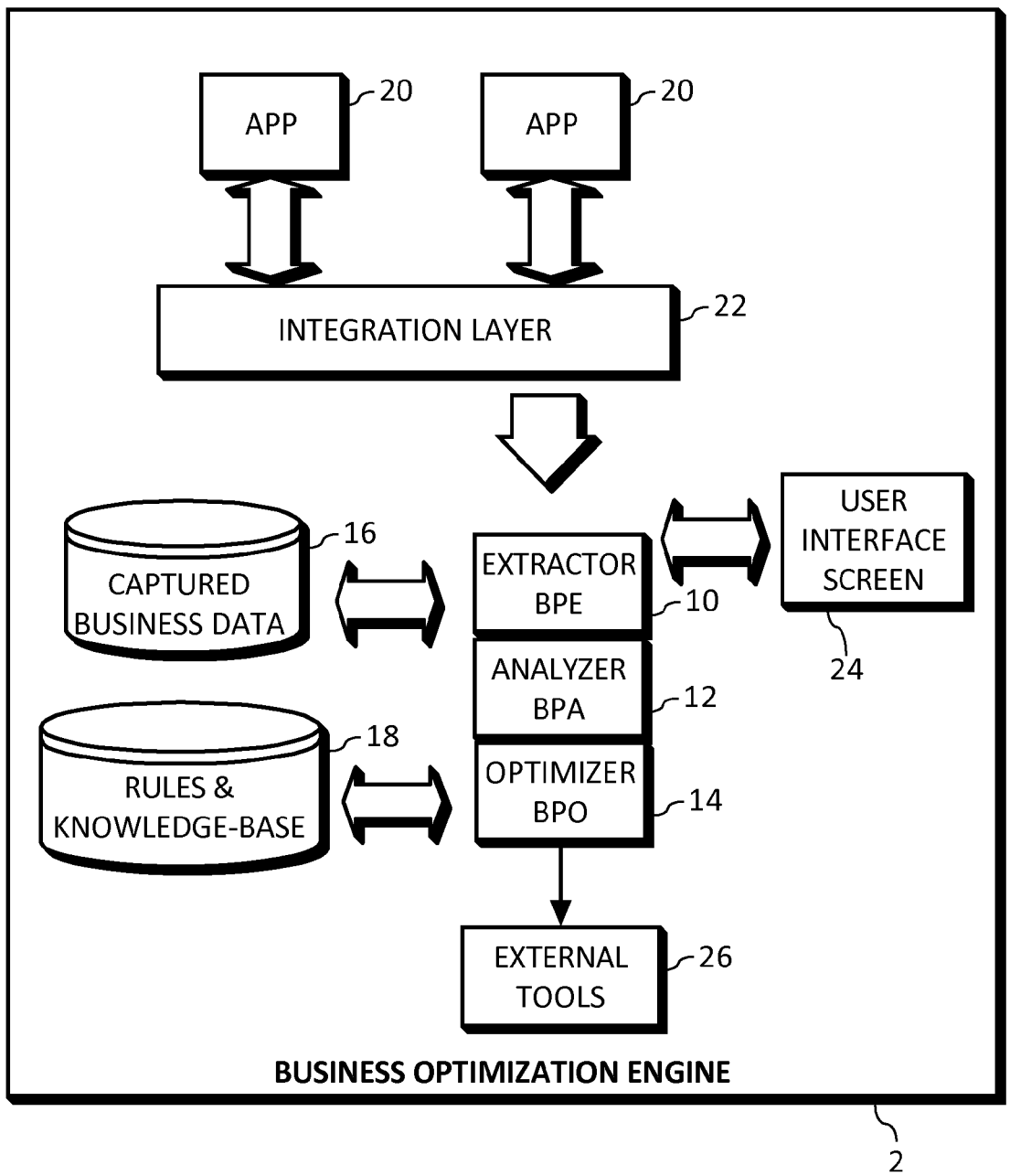
FIG. 1 is a schematic of business optimization engine architecture.

FIG. 1 is a schematic of BOE architecture 2. BOE 2 consists of three components: a business process extractor (BPE) 10, a business process analyzer (BPA) 12, and a business process optimizer (BPO) 14. Each component is described in more detail below. BOE 2 integrates with general BPM-based applications 20. An integration layer 22 provides the interface between middleware and/or the applications 20 and BPE 10. BOE 2 includes a user interface screen 24 described in more detail below. BOE 2 generates and manipulates process data, that is, business data and/or process cycles 16, and creates a rules and knowledge base 18. Reports (not shown) can be produced and output, and information can be exported to external tools 26. Agents can be used within BOE's application framework. In one embodiment, BOE 2 resides on top of CMLINK software.

Figure 2:
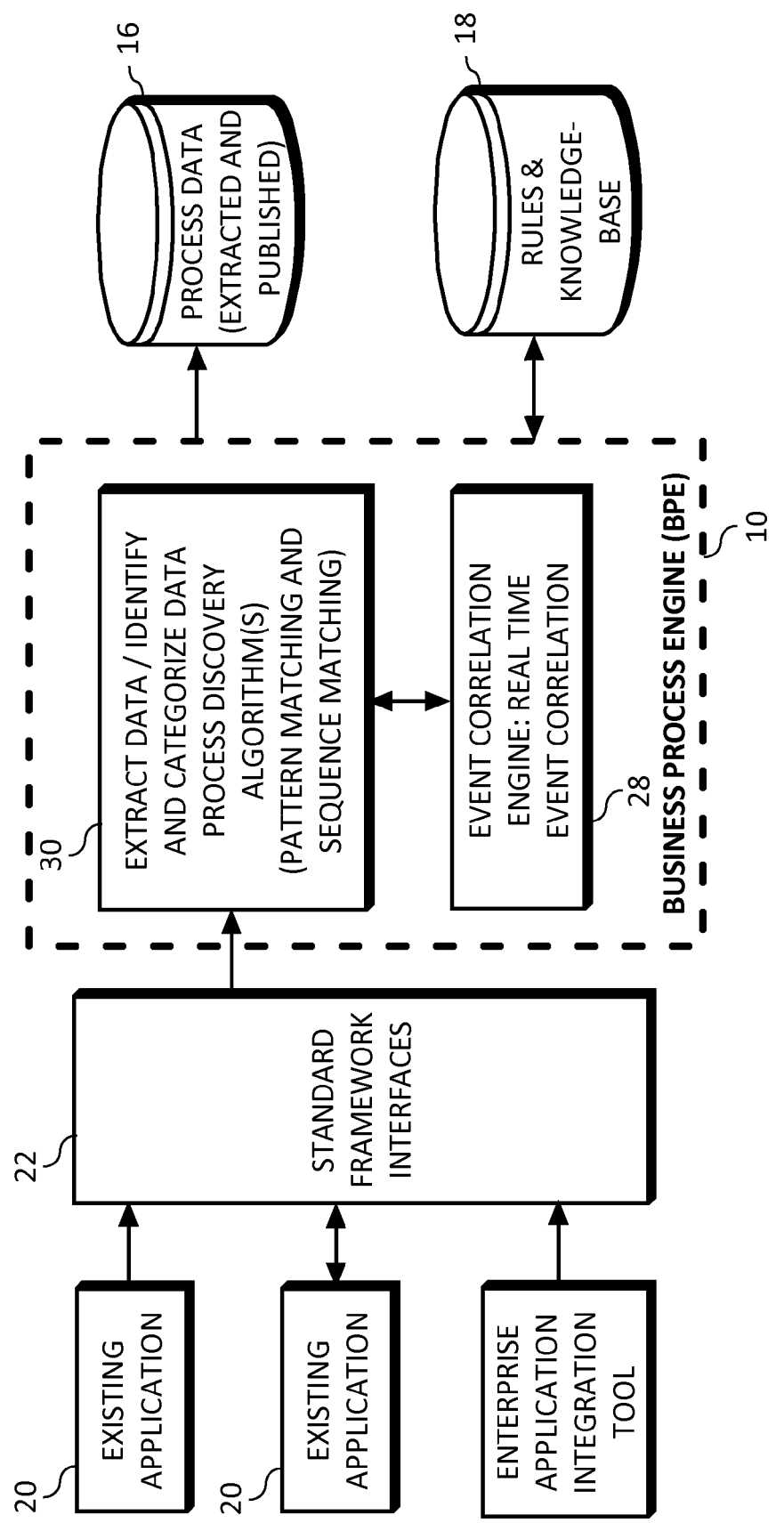
FIG. 2 is a schematic of the extraction component of the exemplary architecture.

FIG. 2 illustrates the components of BPE 10. BPE 10 extracts complete, i.e. end-to-end, process life cycle information from business solutions implemented by integrating heterogeneous independent BPM-based applications 20. Integration layer 22 includes standard framework interfaces, as well as other interface processes known in the art, and can be used to interface between the applications 20 and BPE 10. Real time processes are extracted from these applications 20, enabling creation of an exact "picture", that is a description of the steps, inputs, etc., of each existing process. This picture can illustrate, among other things, gaps within the process.

BPE 10 supports multiple ways of extracting process information. Three such techniques follow, but other extracting methods can be used. One approach employs a plug-in, such as ECM Integration Bridge, which can interpret messages exchanged via an integrated platform. A second technique uses a message "publish and subscribe" mechanism, in which BPE 10 subscribes for specific messages published by the integrated business solution. A third method involves seamlessly inserting stubs into existing applications to expose relevant message data to achieve the extraction. BPE 10 can use these or other extraction techniques in any combination.

The extracted data is then correlated and stored as process data in a data repository 16. In one embodiment, the message content of the extracted data is inspected using data present in the rules and knowledge base 18 to identify and categorize the process context within the message. Identification and categorization can be performed by process discovery 30 using pattern matching and sequence matching in conjunction with the data in the rules and knowledge base 18.

Once the process context is identified, BPE 10 correlates the identified message with other related process messages to create a complete end-to-end life cycle. An event correlation engine 28 can perform real time event correlation.

After being correlated, the life cycle or process cycle is published to the data repository as process data 16 in an industry standard format such as business process modeling notation (BPMN) or business process execution language (BPEL). As a result, BPE 10 provides a clear picture of the real time process. Further, extracted life cycle data can be used to determine how many similar cycles are present in the data repository 16 to help identify patterns, and to process usage patterns. The stored process data 16 is further analyzed by the BPA 12 as described below.

Figure 3:
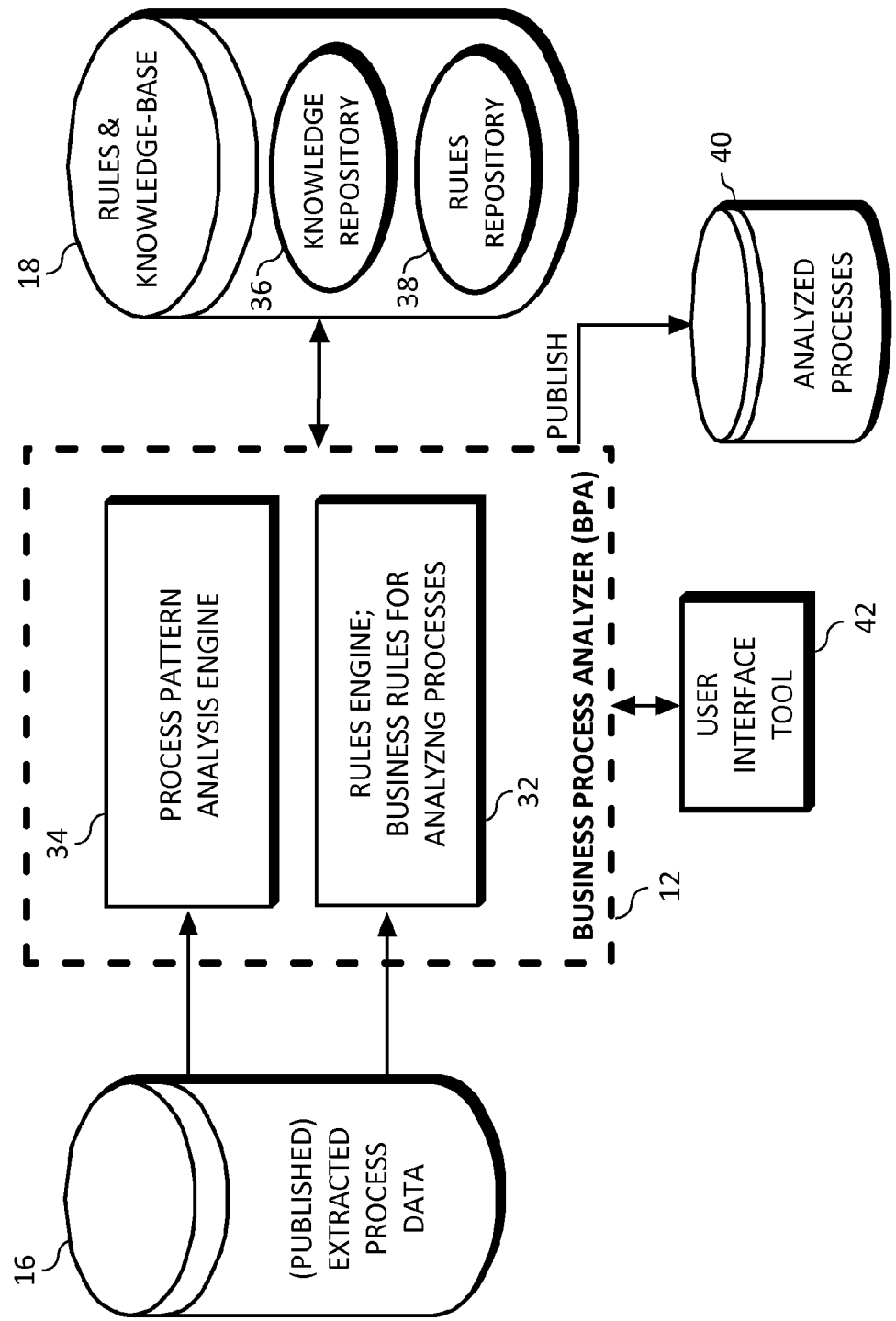
FIG. 3 is a schematic of the analytical component of the exemplary architecture.

FIG. 3 illustrates the components of the BPA 12 shown in FIG. 1. BPA 12 analyzes extracted process data 16 with a process pattern analysis engine 34. The analysis can be performed using reference models present in the knowledge repository 36 and/or rules from the rules repository 38 from rules and knowledge base 18, and identifies usage patterns in the extracted process data or cycles 16. In addition, this extracted process data 16 is correlated with data in the knowledge repository 36, which may include analyzed processes 40 previously output from BPA 12, as discussed below. The process data 16 can be used for identifying bottlenecks and fine-tuning a process. Also, information can be obtained from the analysis of the process data 16, such as a root cause for a process problem, for example, why the approval process takes so long. The process data 16 can also be used for adaptive learning, that is, adopting an efficient real time process as a standard reference model in the knowledge repository 36.

Analysis of the process data 16 by BPA 12 in relation to other extracted information from the knowledge/rules repositories 18 can provide insight into existing processes. BPA 12 can promote understanding of the interrelationships among business applications and processes, and can offer details regarding integration of different applications and process re-engineering including conversion of multiple parallel processes performed by different departments, to a single enterprise-level standard process.

A user interface tool 42 enables input and display of information and diagrams, such as extracted processes and/or steps of process data 16 being analyzed. BPA 12 can combine or compare the process data 16 with data from a knowledge repository 36, best practices, user input, and a rules repository 38 in a rules engine 32 to establish what process is where, what belongs, and how it relates. In accordance with one embodiment, BPA 12 can determine if a similar process has been encountered using data in the rules and knowledge base 18. Upon completion of the analysis, BPA 12 publishes analyzed processes 40. Further, based on the analysis, BPA 12 can recommend an integrated solution.

Figure 8:
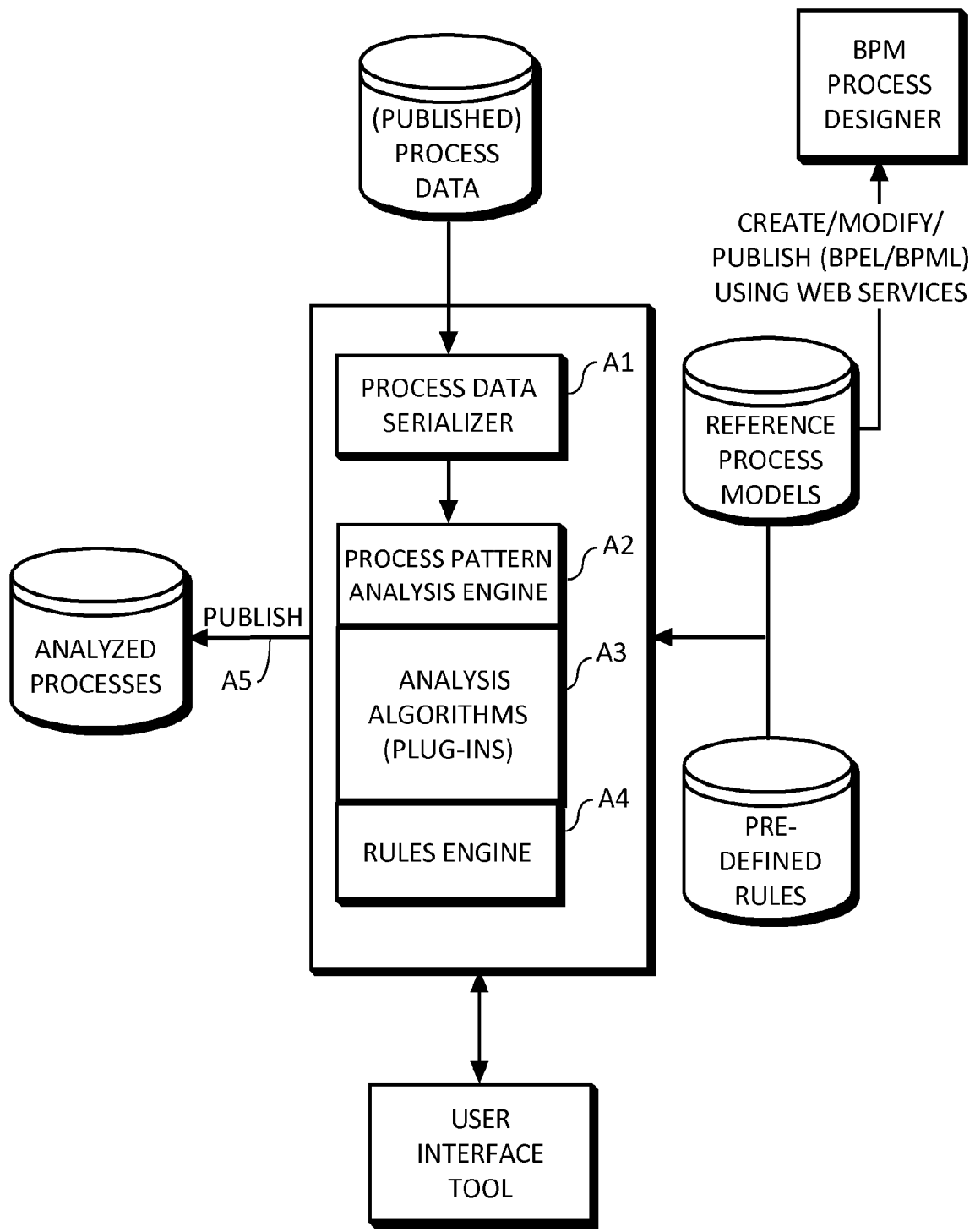
FIG. 8 is a flow diagram of the analyzer component of the exemplary architecture.

FIG. 8 shows the flow of BPA 12 in accordance with the architecture illustrated in FIGS. 1 and 3. BPA 12 receives or obtains process data or end-to-end life cycles 16 through a data acquisition interface 22. In step A1, the received process data 16 is serialized. In step A2, the process pattern analysis engine 34 identifies patterns in the serialized process data. The analysis can be further performed in step A3 using algorithms for process analysis; these algorithms can be pluggable via pre-defined interfaces. In addition, in step A4, the rule manager or rules engine 32 applies pre-defined rules to the life cycles 16 during process analysis. Based on the identified patterns, inadequacies in the process data 16 and/or discrepancies with known patterns can be uncovered, and refinements to the process data 16 can be suggested. Upon completion of the analysis, BPA 12 publishes the analyzed processes 40 in step A5.

Reference process models for end to end business processes can be used to assist with identification of patterns and finding of discrepancies or inadequacies. These reference process models can be obtained from a standard BPM process designer and/or created using Web services. In addition or in the alternative, pre-defined rules can be used to assist with pattern identification. The pre-defined rules are generally different steps of given a business process or procedure that can be easily customized without modifying the end to end processes.

A user interface tool 42 can be used for managing reference processes, rules, and other inputs. In addition, the user interface tool 42 can display diagrams as well as information regarding the analysis of the process data 16.

Figure 4:
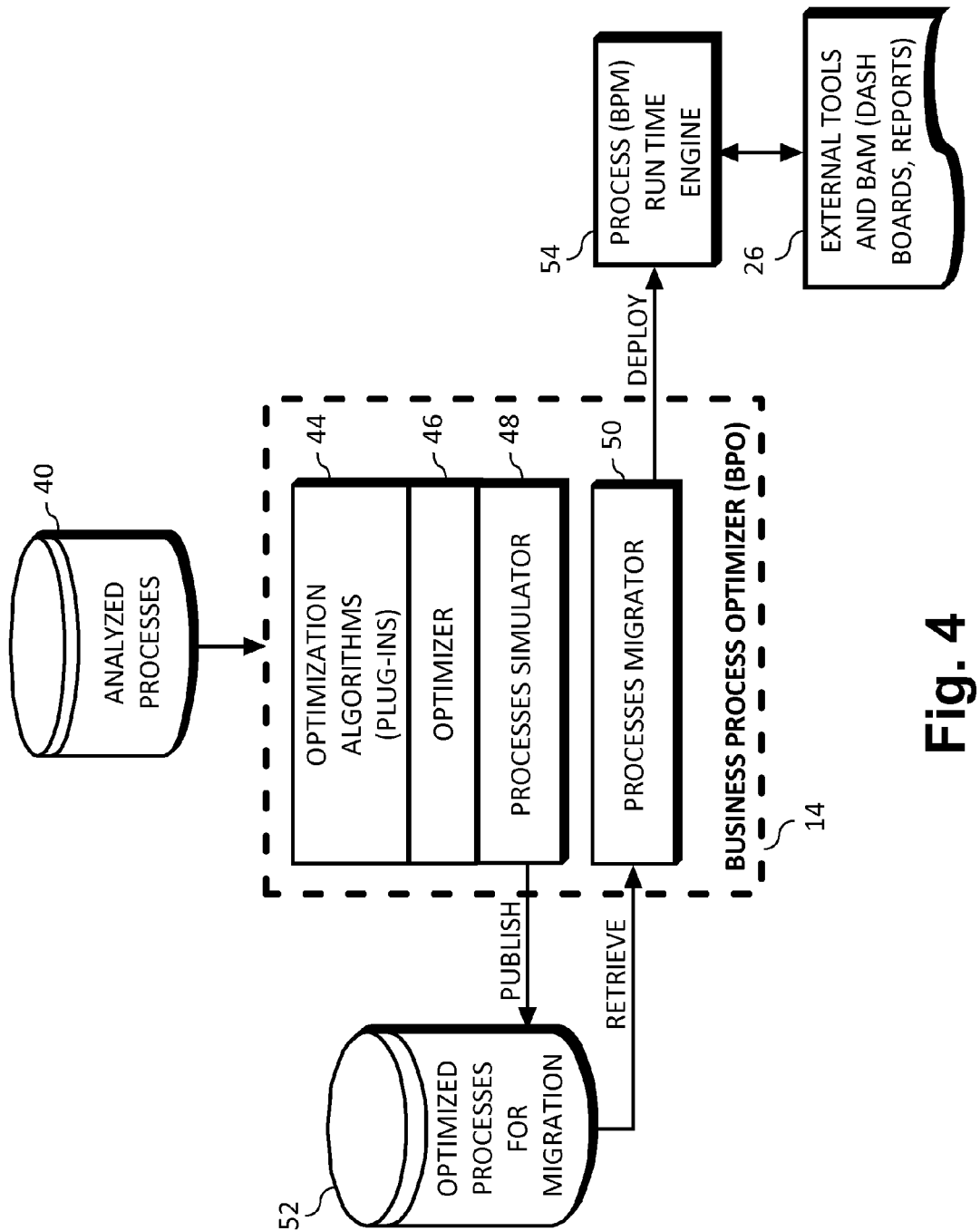
FIG. 4 is a schematic of the optimization component of the exemplary architecture.

FIG. 4 illustrates the components of the BPO 14. These components include process optimization algorithms 44, an optimizer 46, a process simulator 48, and a process migrator 50. Optimization algorithms 44 can include algorithms that perform "what if" analysis, heuristic methods of optimization, and other techniques. Multiple optimization techniques can be combined. The optimizer 46 suggests required modifications to the analyzed processes 40. The process simulator 48 simulates the processes 40 to determine how they perform. Optimized processes 52 are published for migration and can be input to the process migrator 50. The process migrator 50 outputs processes to a standard run time engine 54 and/or to external tools 26 such as business activity monitoring (BAM) tools for obtaining reports.

BPO 14 uses information stored in the knowledge/rules repositories 18 to optimize an analyzed process 40, creating an optimized process 52. In one embodiment, a business analyst can interact with the system to manually optimize an analyzed process 40.

Figure 5:
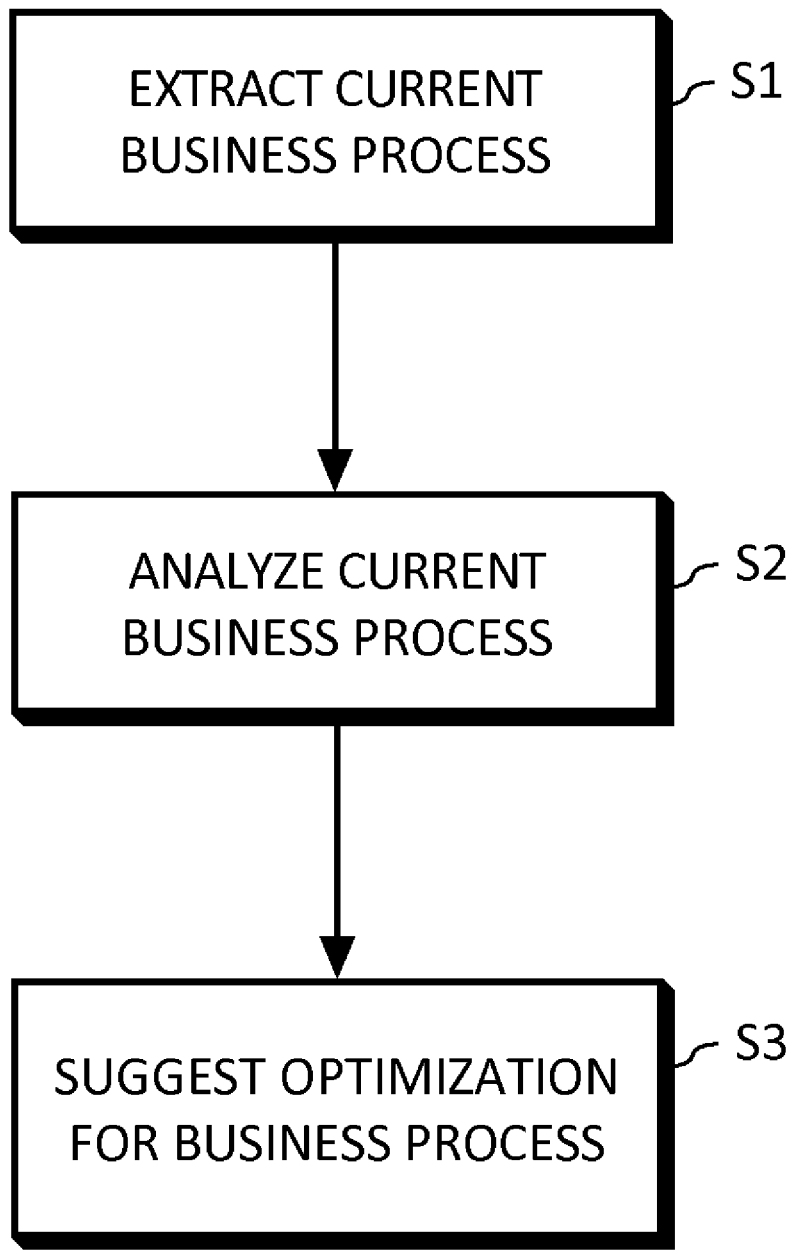
FIG. 5 is a flow diagram of business optimization engine.

FIG. 5 is a flow diagram for an exemplary embodiment of BOE 2 as illustrated in FIG. 1. In step S1, the BPE 10 extracts one or more current business processes 16 from BPM-based applications 20. These business processes 16 are stored as extracted process data 16, and individually analyzed by the BPA 12 in step S2. The analysis can include identifying usage patterns, comparing extracted processes 40 with pre-defined processes in the rules repository 38, and other techniques. Upon completion of the analysis, analyzed processes 40 are output. In step S3, based on the analysis, BPO 14 provides optimization suggestions for each individual process 40 analyzed in step S2. In one embodiment, current business processes can be monitored.

FIGS. 6 and 7 show a sample user interface screen 24 for one embodiment of BOE 2. The top portion of the screen displays a process flow for Issue 123 and the middle portion of the screen displays a process flow for Issue 124. This data has been extracted by BPE 10 and saved as extracted process data 16. As shown in FIGS. 6 and 7, each entry or activity in the process flow includes a status, a description, a "note by" employee, and a time stamp. These items are displayed on both the screen's top portion and the screen's middle portion. The screen's middle portion also includes analysis and displays the actual hours each event took (Hrs./Event), along with a standard number of hours per event (Std Hrs./Event) obtained, for example, from a rules repository 38. The deviation or difference between actual and standard is calculated and displayed (Deviation (Hrs.)) along with an updated column (Updated (Hrs.)) in which "what-if" analysis can be performed. The updated column is initially populated with the data from the actual hours/event column, as shown in FIG. 6. A user can perform "what-if" analysis by changing one or more entries in the updated column. FIG. 7 illustrates a "what-if" analysis, described in more detail below.

The screen's bottom portion, shown in FIGS. 6 and 7, illustrates optimized process outcome for multiple extracted process flows, including the Issue 123 displayed in the screen's top portion and the Issue 124 displayed in the screen's middle portion. Changes in the updated column in the middle portion are reflected in the corresponding row of the bottom portion. As shown in FIG. 7, the user changed the ASSIGNED row for Issue 124 in the screen's middle portion from 0.75 (Hrs.) to 0.25 (Hrs.). This resulted in the "total time taken" column in the top row of the screen's bottom portion, that is, the row for Issue 124, changing from 1.27 (Hrs.) to 0.78 (Hrs.), and the "total deviation" column changing from 4.73 (Hrs.) to 5.22 (Hrs.). The "total deviation" is computed by BPO 14 as the "total time taken" subtracted from the "original time", that is, the amount of time originally allocated for the task. The original time can be obtained, for example, from the rules repository 38 or knowledge repository 36.

BOE 2 seamlessly translates the identified process in the form of BPMN and/or BPEL. Translated business processes can be exported to external tools 26 like MS Visio®. This feature simplifies the making of process changes, by enabling the use of any tool that supports BPEL and BPMN standards to implement changes. Accordingly, BOE 2 not only helps in identifying bottlenecks in the existing solutions but also improves performance of the solutions to the optimum level.

While the present invention has been described in particular embodiments, it should be appreciated that the present invention should not be construed as limited by such embodiments, but rather construed according to the below claims.

What is claimed is:

1. A method for analyzing business processes, said method comprising the steps of:
    obtaining process data from end-to-end business processes using a data acquisition interface;
    serializing said process data;
    identifying patterns in said serialized process data;
    creating analyzed process data based on said identified patterns and displaying said analyzed process data on a user interface screen; and
    publishing said analyzed process data,
    wherein said step of identifying is performed using at least one of user-defined algorithms, rules, and reference process models.

2. The method according to claim 1, wherein said user-defined algorithms are plug-ins.

3. A computer readable storage medium having computer readable program for operating on a computer for analyzing business processes, said program comprising instructions that cause the computer to perform the steps of:
    obtaining process data from end-to-end business processes using a data acquisition interface;
    serializing said process data;
    identifying patterns in said serialized process data;
    creating analyzed process data based on said identified patterns and displaying the analyzed process data on a user interface screen; and
    publishing said analyzed process data,
    wherein said step of identifying is performed using at least one of user-defined algorithms, rules, and reference process models.

4. The computer readable program according to claim 3, wherein said user-defined algorithms are plug-ins.

5. A system for analyzing business processes, comprising:
    process data obtained using a data acquisition interface;
    a process data serializer for serializing said process data;
    a process pattern analysis engine for identifying patterns in said serialized process data and creating analyzed process data based on said identified patterns; and
    a user tool interface for displaying information regarding the analyzed process data;
    wherein said analyzed process data is published, and identifying patterns is performed using at least one of user-defined algorithms, rules, and reference process models.

6. The system according to claim 5, wherein said user-defined algorithms are plug-ins.

7. The system according to claim 5, wherein the user tool interface manages at least one of user-defined algorithms, and reference process models.

8. The system according to claim 5, further comprising a rules engine for identifying patterns using rules.

* * * * *